(12) United States Patent
Longenecker et al.

(10) Patent No.: US 11,982,458 B2
(45) Date of Patent: May 14, 2024

(54) AIR CONDITIONER MAKEUP AIR CIRCULATION

(71) Applicant: Haier US Appliance Solutions, Inc., Wilmington, DE (US)

(72) Inventors: Joshua Duane Longenecker, Louisville, KY (US); Charles D. Robinson, III, Louisville, KY (US); Timothy Scott Shaffer, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 19 days.

(21) Appl. No.: 17/577,508

(22) Filed: Jan. 18, 2022

(65) Prior Publication Data

US 2023/0228447 A1   Jul. 20, 2023

(51) Int. Cl.
| | | |
|---|---|---|
| F24F 11/77 | (2018.01) | |
| F24F 1/0035 | (2019.01) | |
| F24F 11/00 | (2018.01) | |

(52) U.S. Cl.
CPC ............ *F24F 11/77* (2018.01); *F24F 1/0035* (2019.02); *F24F 11/0001* (2013.01); *F24F 2011/0002* (2013.01)

(58) Field of Classification Search
CPC ...... F24F 11/0001; F24F 11/77; F24F 1/0035; F24F 2011/0002
See application file for complete search history.

(56) References Cited

U.S. PATENT DOCUMENTS

| | | | |
|---|---|---|---|
| 9,927,138 B2 | 3/2018 | Wiese | |
| 2011/0100043 A1 | 5/2011 | Matubara | |
| 2017/0198934 A1* | 7/2017 | Shaffer | .................... F24F 11/30 |
| 2019/0234650 A1 | 8/2019 | D'Souza | |

FOREIGN PATENT DOCUMENTS

| | | | | |
|---|---|---|---|---|
| CN | 110345616 A | * | 10/2019 | .............. F24F 11/64 |
| CN | 110345616 A | | 10/2019 | |
| KR | 20050118784 A | * | 12/2005 | |

\* cited by examiner

*Primary Examiner* — Edelmira Bosques
*Assistant Examiner* — Michael James Giordano
(74) *Attorney, Agent, or Firm* — Dority & Manning, P.A.

(57) ABSTRACT

Air conditioner units and methods of operating the same are provided. A method of operating an air conditioner unit includes activating a makeup air system of the air conditioner unit. The makeup air system directs a flow of outside air from the makeup air system to an indoor portion of a housing of the air conditioner unit. The method also includes activating an indoor fan disposed in the indoor portion of the air conditioner unit at a fan speed at least equal to a minimum circulation threshold speed in response to the makeup air system being activated. Activating the indoor fan causes the flow of outside air from the makeup air system to be urged through the indoor portion of the housing. An air conditioner unit may include a controller, and the controller may be configured for performing the method.

16 Claims, 4 Drawing Sheets

AIR CONDITIONER MAKEUP AIR CIRCULATION

FIELD OF THE INVENTION

The present subject matter relates generally to air conditioning appliances, and more particularly to air conditioning appliances having a makeup air system.

BACKGROUND OF THE INVENTION

Air conditioner units or air conditioning appliance units are conventionally utilized to adjust the temperature within structures such as dwellings and office buildings. In particular, one-unit type room air conditioner units, such as single-package vertical units (SPVU), or package terminal air conditioners (PTAC) may be utilized to adjust the temperature in, for example, a single room or group of rooms of a structure. A typical one-unit type air conditioner or air conditioning appliance includes an indoor portion and an outdoor portion. The indoor portion generally communicates (e.g., exchanges air) with the area within a building, and the outdoor portion generally communicates (e.g., exchanges air) with the area outside a building. Accordingly, the air conditioner unit generally extends through, for example, an outer wall of the structure. Generally, a fan may be operable to rotate to motivate air through the indoor portion. Another fan may be operable to rotate to motivate air through the outdoor portion. A sealed cooling system including a compressor is generally housed within the air conditioner unit to treat (e.g., cool or heat) air as it is circulated through, for example, the indoor portion of the air conditioner unit. One or more control boards are typically provided to direct the operation of various elements of the particular air conditioner unit.

Makeup air, e.g., additional fresh air from outside of the building, is typically provided by a makeup air system, which may be a large separate system remote from the air conditioner or an internal system with makeup air components internal to the air conditioner. Supplying fresh air via the makeup air system provides several benefits. However, in some instances, the outside air may be warmer and/or more humid than indoor air. Moreover, such conventional makeup air systems are operated independently of the other fans of the air conditioner unit, such as the indoor fan, e.g., the fan operable to rotate to motivate air through the indoor portion. Thus, in some instances, the makeup air system may provide outside air to the indoor portion of the air conditioner unit while the indoor fan is rotating slowly or not at all.

As a result, further improvements to air conditioners may be advantageous. In particular, it would be useful to provide an air conditioner unit with a makeup air system that also provides improved circulation in all operating modes.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating an air conditioner unit is provided. The air conditioner unit includes a housing defining an outdoor portion and an indoor portion. The air conditioner unit also includes a makeup air system. An indoor fan is disposed in the indoor portion and downstream of the makeup air system with respect to a flow of outside air through the makeup air system. The method includes activating the makeup air system of the air conditioner unit. As a result, the flow of outside air is directed from the makeup air system to the indoor portion of the housing. In response to the makeup air system being activated, the method then includes activating the indoor fan of the air conditioner unit at a fan speed at least equal to a minimum circulation threshold speed. Activating the indoor fan causes the flow of outside air from the makeup air system to be urged through the indoor portion of the housing.

In another exemplary aspect of the present disclosure, an air conditioner unit is provided. The air conditioner unit includes a housing defining an outdoor portion and an indoor portion. The air conditioner unit also includes a makeup air system. An indoor fan is disposed in the indoor portion and downstream of the makeup air system with respect to a flow of outside air through the makeup air system. The air conditioner unit also includes a controller. The controller is configured for activating a makeup air system of the air conditioner unit to cause the flow of outside air to be directed from the makeup air system to the indoor portion of the housing. The controller is also configured for activating the indoor fan of the air conditioner unit at a fan speed at least equal to a minimum circulation threshold speed in response to the makeup air system being activated. Activating the indoor fan causes the flow of outside air from the makeup air system to be urged through the indoor portion of the housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
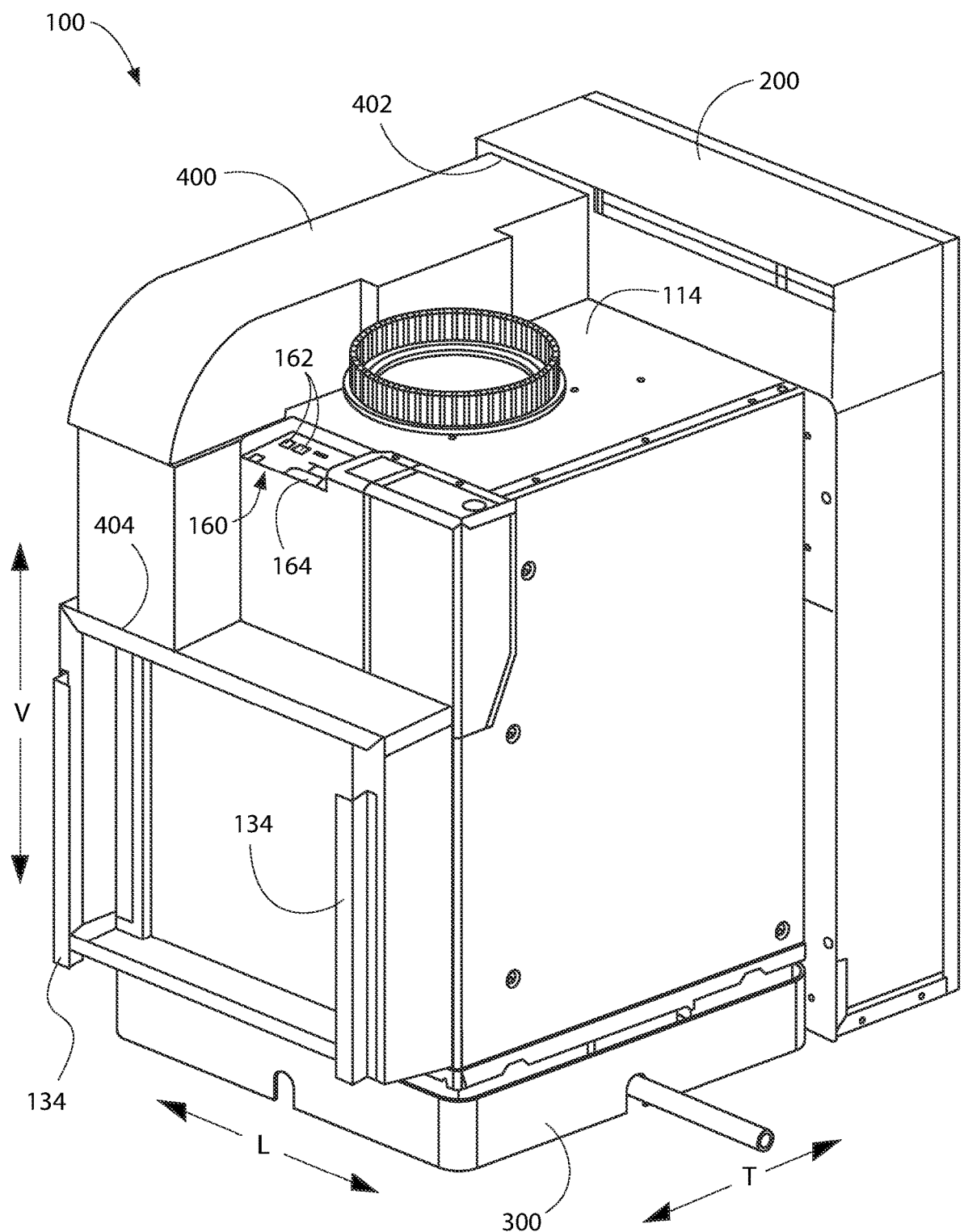
FIG. 1 provides a perspective view of an air conditioner unit according to one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
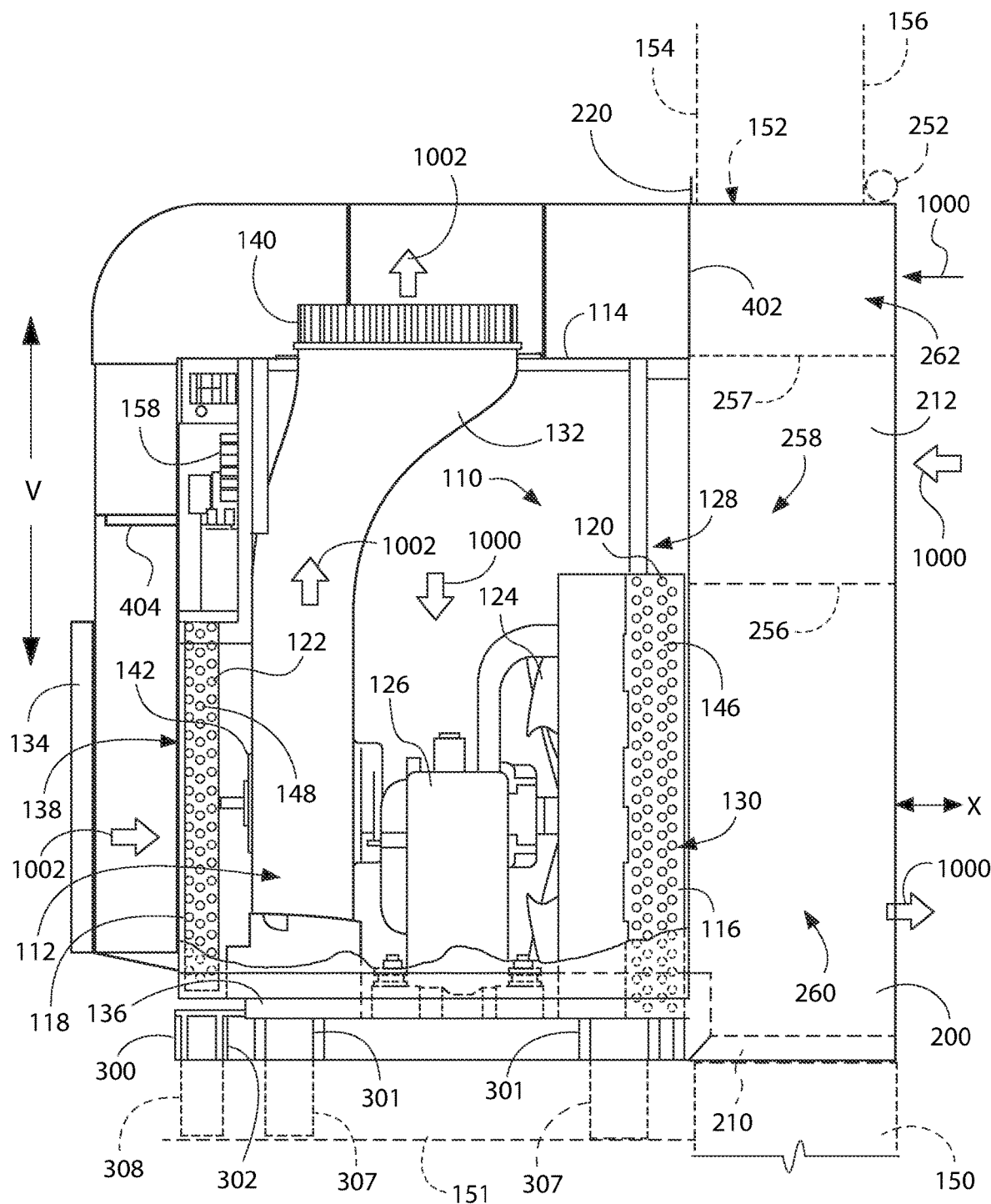
FIG. 2 provides a section view of the air conditioner unit of FIG. 1 according to one or more exemplary embodiments of the present disclosure.

Turning now to the figures, FIGS. 1 and 2 illustrate an exemplary air conditioner appliance or air conditioner unit (e.g., air conditioner 100). As shown, air conditioner 100 may be provided as a one-unit type air conditioner 100, such as a single-package vertical unit. Air conditioner 100 includes a package housing 114 supporting an indoor portion 112 and an outdoor portion 110.

Generally, air conditioner 100 defines a vertical direction V, lateral direction L, and transverse direction T. Each direction V, L, T is mutually perpendicular with every other direction, such that an orthogonal coordinate system is generally defined.

In some embodiments, housing 114 contains various other components of the air conditioner 100. Housing 114 may include, for example, a rear opening 116 (e.g., with or without a grill or grate thereacross) and a front opening 118 (e.g., with or without a grill or grate thereacross) may be spaced apart from each other along the transverse direction T. The rear opening 116 may be part of the outdoor portion 110, while the front opening 118 may be part of the indoor portion 112. Components of the outdoor portion 110, such as an outdoor heat exchanger 120, outdoor fan 124, and compressor 126 may be enclosed within housing 114 between front opening 118 and rear opening 116. In certain embodiments, one or more components are mounted on a base 136, as shown. The base 136 may be received on or within a drain pan 300.

During certain operations, air 1000 may be drawn to outdoor portion 110 through rear opening 116. Specifically, an outdoor inlet 128 defined through housing 114 may receive outdoor air 1000 motivated by outdoor fan 124. Within housing 114, the received outdoor air 1000 may be motivated through or across outdoor fan 124. Moreover, at least a portion of the outdoor air 1000 may be motivated through or across outdoor heat exchanger 120 before exiting the rear opening 116 at an outdoor outlet 130. It is noted that although outdoor inlet 128 is illustrated as being defined above outdoor outlet 130, alternative embodiments may reverse this relative orientation (e.g., such that outdoor inlet 128 is defined below outdoor outlet 130) or provide outdoor inlet 128 beside outdoor outlet 130 in a side-by-side orientation, or another suitable orientation.

As shown, indoor portion 112 may include an indoor heat exchanger 122, and an indoor fan 142, e.g., a blower fan 142 as in the illustrated example embodiment. These components may, for example, be housed behind the front opening 118. A bulkhead may generally support or house various other components or portions thereof of the indoor portion 112, such as the blower fan 142. The bulkhead may generally separate and define the indoor portion 112 and outdoor portion 110 within housing 114.

During certain operations, air 1002 may be drawn to indoor portion 112 through front opening 118. Specifically, an indoor inlet 138 defined through housing 114 may receive indoor air 1002 motivated by blower fan 142. At least a portion of the indoor air 1002 may be motivated through or across indoor heat exchanger 122 before passing to a duct 132. The indoor air 1002 may be motivated (e.g., by fan 142) into and through the duct 132 and returned to the indoor area of the room through an indoor outlet 140 defined through housing 114 (e.g., above indoor inlet 138 along the vertical direction V). Optionally, one or more conduits (not pictured) may be mounted on or downstream from indoor outlet 140 to further guide air 1002 from air conditioner 100. It is noted that although indoor outlet 140 is illustrated as generally directing air upward, it is understood that indoor outlet 140 may be defined in alternative embodiments to direct air in any other suitable direction.

Outdoor and indoor heat exchangers 120, 122 may be components of a thermodynamic assembly (i.e., sealed system), which may be operated as a refrigeration assembly (and thus perform a refrigeration cycle) or, in the case of the heat pump unit embodiment, a heat pump (and thus perform a heat pump cycle). Thus, as is understood, exemplary heat pump unit embodiments may be selectively operated to perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in a cooling mode).

The sealed system may, for example, further include compressor 126 (e.g., mounted on base 136) and an expansion device (e.g., expansion valve or capillary tube—not pictured), both of which may be in fluid communication with the heat exchangers 120, 122 to flow refrigerant therethrough, as is generally understood. The outdoor and indoor heat exchangers 120, 122 may each include coils 146, 148, as illustrated, through which a refrigerant may flow for heat exchange purposes, as is generally understood.

A plenum 200 may be provided to direct air to or from housing 114. When installed, plenum 200 may be selectively attached to (e.g., fixed to or mounted against) housing 114 (e.g., via a suitable mechanical fastener, adhesive, gasket, etc.) and extend through a structure wall 150 (e.g., an outer wall of the structure within which air conditioner 100 is installed) and above a floor 151. In particular, plenum 200 extends along an axial direction X (e.g., parallel to the transverse direction T) through a hole or channel 152 in the structure wall 150 that passes from an internal surface 154 to an external surface 156. Optionally, a caulk bead 252 (i.e., adhesive or sealant caulk) may be provided to join the plenum 200 to the external surface 156 of structure wall 150 (e.g., about or outside from wall channel 152).

The plenum 200 includes a duct wall 212 that is formed about the axial direction X (e.g., when mounted through wall channel 152). Duct wall 212 may be formed according to any suitable hollow shape, such as conduit having a rectangular profile (shown), defining an air channel 210 to guide air therethrough. Moreover, duct wall 212 may be formed from any suitable non-permeable material (e.g., steel, aluminum, or a suitable polymer) for directing or guiding air therethrough. In certain embodiments, plenum 200 further includes an outer flange 220 that extends in a radial direction (e.g., perpendicular to the axial direction X) from duct wall 212. Specifically, outer flange 220 may extend radially outward (e.g., away from at least a portion of the axial direction X or the duct wall 212).

In some embodiments, plenum 200 includes a divider wall 256 within air channel 210. When assembled, divider wall 256 defines a separate upper passage 258 and lower passage 260. For instance, divider wall 256 may extend along the lateral direction L from one lateral side of plenum 200 to the other lateral side. Generally, upper passage 258 and lower passage 260 may divide or define two discrete air flow paths for air channel 210. When assembled, upper passage 258 and lower passage 260 may be fluidly isolated by divider wall 256 (e.g., such that air is prevented from passing directly between passages 258 and 260 through divider wall 256, or another portion of plenum 200). Upper passage 258 may be positioned upstream from outdoor inlet 128. Lower passage 260 may be positioned downstream from outdoor outlet 130.

The plenum 200 may further include a second divider wall 257 which separates a makeup air passage 262 from the remainder of the air channel 210, such as from the upper passage 258 and the lower passage 260. For example, the makeup air passage 262 may be positioned directly above the upper passage 258, whereby the second divider separates and partially defines the makeup air passage 262 and the upper passage 258, e.g., as in the exemplary embodiment illustrated in FIG. 2. Similar to the divider wall 256 described above, the second divider wall 257 may extend along the lateral direction L from one lateral side of plenum 200 to the other lateral side. The makeup air passage 262 may thereby define a discrete air flow path within air channel 210 which is separate and distinct from the upper and lower passages 258 and 260. When assembled, the makeup air passage 262 may be fluidly isolated by the second divider wall 257 from one or both of the upper passage 258 and lower passage 260, e.g., such that air is prevented from passing directly between the makeup air passage 262 and the upper and lower passages 258 and 260 through the second divider wall 257, or any other portion of plenum 200). The makeup air passage 262 may be positioned upstream from a makeup air duct 400. In some embodiments, outdoor air 1000 may be drawn into the makeup air duct 400 by a makeup air fan, e.g., muffin fan 406 (FIG. 3), via the makeup air passage 262. The makeup air duct 400 may extend from a first end 402 at the makeup air passage 262 of the plenum 200 to a second end 404 at the indoor portion 112 of the housing 114, e.g., upstream of the indoor inlet 138, whereby outdoor air, e.g., makeup air, may be provided directly to the indoor portion 112 of the air conditioner 100 via the makeup air duct 400. Thus, the makeup air duct 400 may be a component of a makeup air system or makeup air assembly.

The operation of air conditioner 100 including compressor 126 (and thus the sealed system generally), indoor fan 142, outdoor fan 124, and other suitable components may be controlled by a control board or controller 158. Controller 158 may be in communication (via for example a suitable wired or wireless connection) to such components of the air conditioner 100. By way of example, the controller 158 may include a memory and one or more processing devices such as microprocessors, CPUs or the like, such as general or special purpose microprocessors operable to execute programming instructions or micro-control code associated with operation of air conditioner 100. The memory may be a separate component from the processor or may be included onboard within the processor. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 158 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Further, it should be understood that controllers 158 as disclosed herein are capable of and may be operable to perform any methods and associated method steps as disclosed herein.

Air conditioner 100 may additionally include a control panel 160 (FIG. 1) and one or more user inputs 162, which may be included in control panel 160. The user inputs 162 may be in communication with the controller 158. A user of the air conditioner 100 may interact with the user inputs 162 to operate the air conditioner 100, and user commands may be transmitted between the user inputs 162 and controller 158 to facilitate operation of the air conditioner 100 based on such user commands. A display 164 may additionally be provided in the control panel 160, and may be in communication with the controller 158. Display 164 may, for example be a touchscreen or other text-readable display screen, or alternatively may simply be a light that can be activated and deactivated as required to provide an indication of, for example, an event or setting for the air conditioner 100.

Also as may be seen in FIG. 2, in some instances when the plenum 200 is installed within the wall 150 above the floor 151, the remainder of the air conditioner unit 100 may be suspended or cantilevered from the plenum 200. In order to avoid such cantilever, one or more support legs 307 and/or 308 may be provided between the drain pan 300 and the floor 151, whereby at least some of the weight of the remaining components of the air conditioner unit 100 is shifted off of the plenum 200. Where the installation height of the plenum 200 above the floor 151 varies, the required height of the leg(s) 307 and/or 308 will also vary. Thus, the leg(s) 307 and/or 308 may be cut in the field and custom-fitted to the specific installation.

The drain pan 300 may include one or more sockets which are configured to receive the leg(s) 307 and/or 308. For example, as illustrated in FIG. 2, the drain pan 300 may include a first socket 301 and a second socket 302. As illustrated in FIG. 2, the socket(s) 301 and/or 302 may be positioned opposite the plenum 200 along the transverse direction T. For example, the plenum 200 may be positioned at a first transverse end of the drain pan 300 and the socket(s) 301/302 may be positioned opposite the plenum 200 at or near a second transverse end of the drain pan 300. Also as may be seen in FIG. 2, in some embodiments the drain pan 300 may also or instead include one or more of the sockets 301 and/or 302 at the other end of the pan 300, e.g., proximate the plenum 200. In various embodiments, one or both of the sockets 301 and 302 may be provided. In some embodiments, each socket 301 and 302 may be one of a pair of matching shaped sockets which are spaced apart along the lateral direction L and aligned along the transverse direction T.

The material for the leg(s) 307 and/or 308 may be any suitable material which is strong enough to bear the weight of the housing 114 and drain pan 300. For example, materials which are likely to be readily available during installation of the air conditioner unit and which can be suitable for forming the leg(s) 307 and/or 308 include building materials such as lumber, e.g., dimensional lumber such as a nominal two-inch-by-four-inch board, commonly referred to as a two-by-four, or plumbing, e.g., PVC piping having sufficient size (e.g., outer diameter, wall thickness, etc.). Thus, in some embodiments, the socket, e.g., first socket 301, may have a rectangular cross-section and may thereby be configured to receive a leg 307 made of lumber, such as a two-by-four leg, a two-by-six leg, or a four-by-four leg, etc. Additionally, in some embodiments, the socket, e.g., the second socket 302, may be cylindrical and may thereby be configured to receive a round, e.g., cylindrical, leg 308, such as a piece of piping, e.g., a PVC pipe as mentioned above, or, as another example, a steel pipe or other tubular or solid round leg 308.

Figure 3:
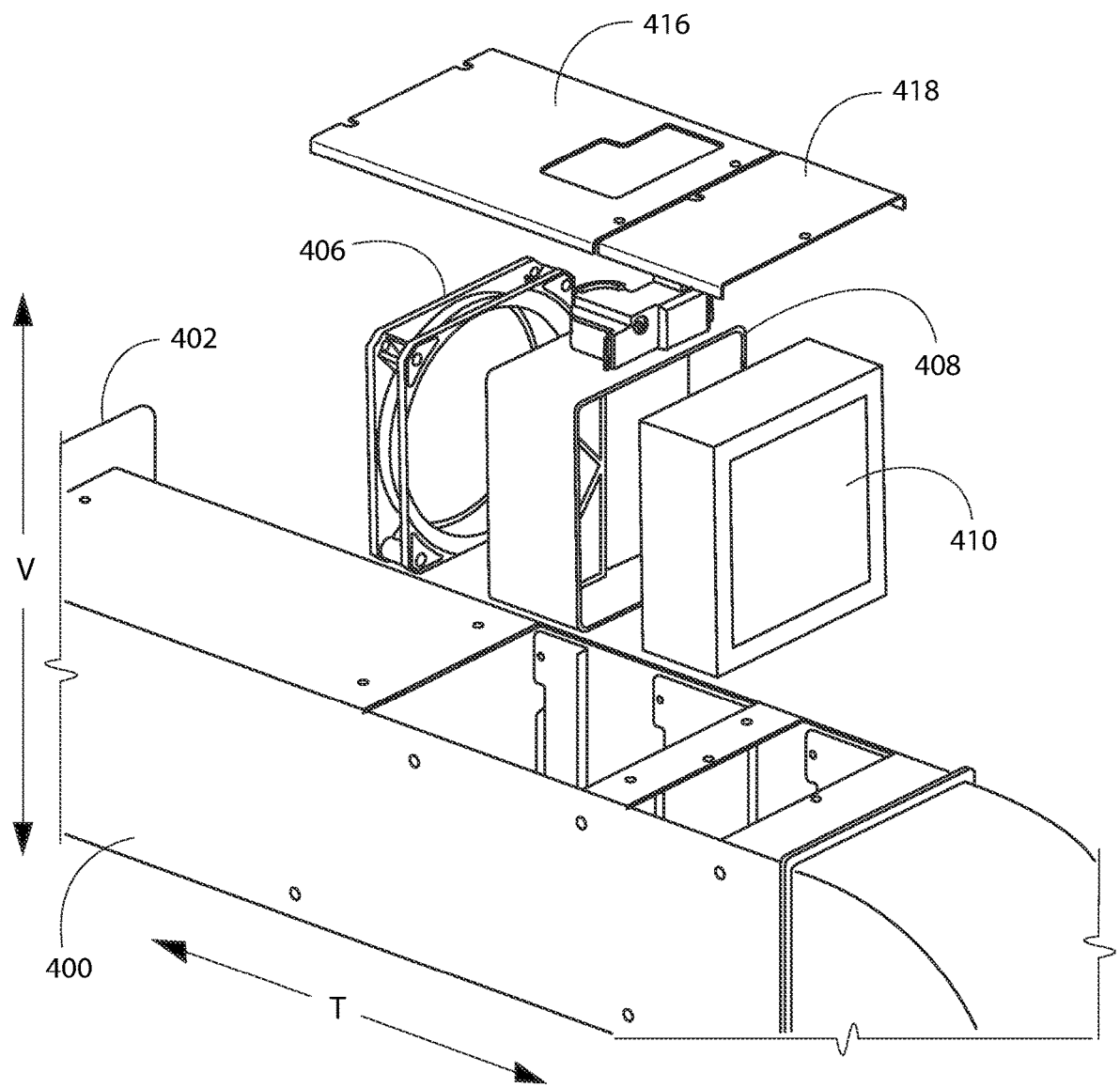
FIG. 3 provides an exploded perspective view of a portion of a makeup air system according to one or more exemplary embodiments of the present disclosure which may be incorporated into an air conditioner unit such as the air conditioner unit of FIG. 1.

As mentioned above, the air conditioner 100 may include a makeup air assembly. Portions of the makeup air assembly according to one or more embodiments of the present disclosure are illustrated in a perspective view in FIG. 3. For example, FIG. 3 provides a perspective views of portions of the makeup air duct 400 with a plurality of makeup air components, e.g., a muffin fan 406, a damper 408, and a filter 410, and a pair of covers 416 and 418. Only the outer frame of the muffin fan 406 is illustrated. Internal components of the fan 406, e.g., blades and a motor, the structure and function of which are well understood by those of ordinary skill in the art, are omitted for the sake of clarity. Additionally, it should be understood that the muffin fan 406, the damper 408, and the filter 410 illustrated in FIG. 3 are by way of example only. In various embodiments of the present disclosure, the makeup air system may include additional or different make-up air components as will be recognized by those of ordinary skill in the art, such as a different axial fan, or two or more fans 406 (such as multiple fans in series), among other possible exemplary makeup air components.

Figure 4:
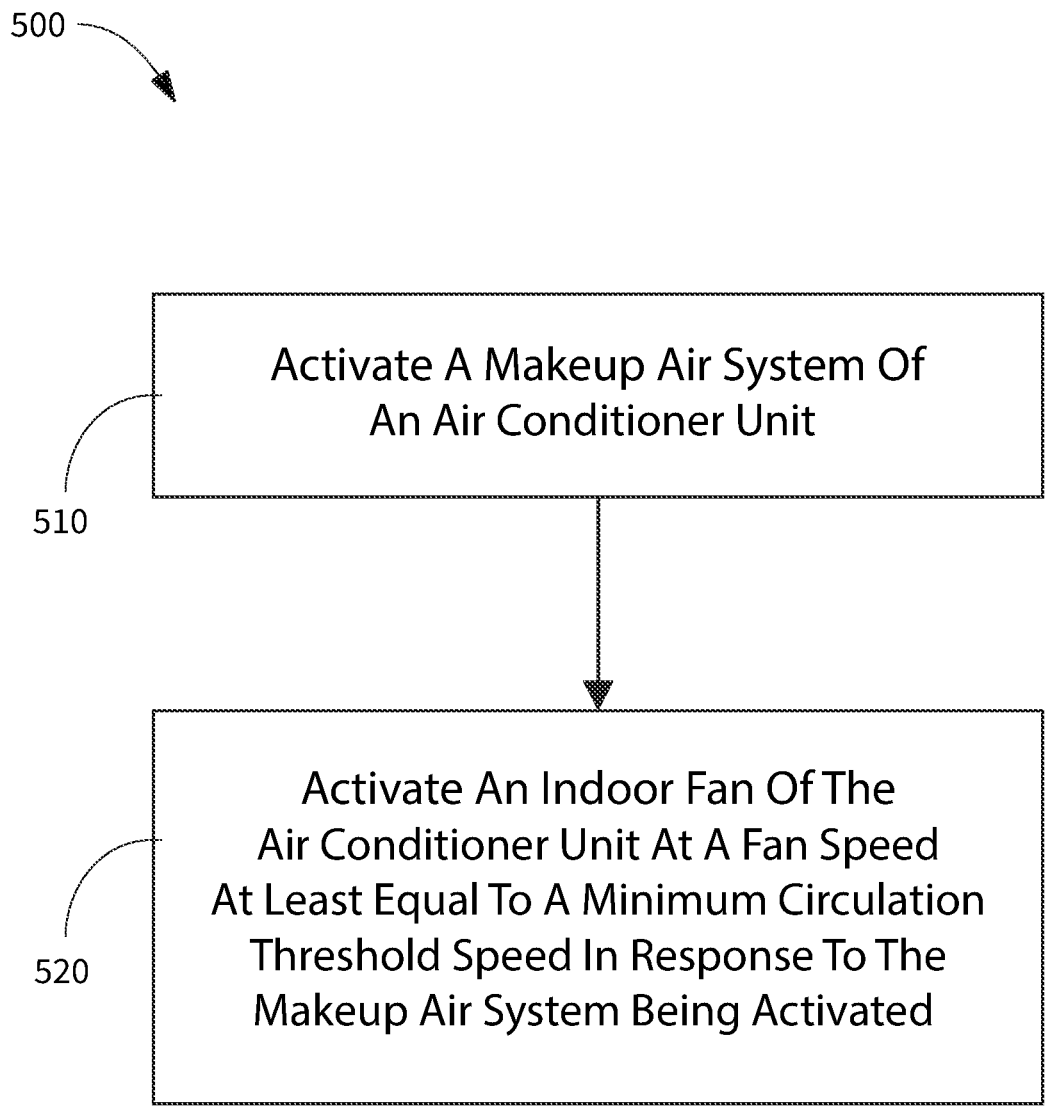
FIG. 4 provides a flowchart illustrating an example method of operating an air conditioner unit according to one or more example embodiments of the present disclosure.

Turning now to FIG. 4, embodiments of the present disclosure also include methods of operating an air conditioner unit such as method 500 illustrated in FIG. 4, where the air conditioner unit may be, e.g., the air conditioner unit 100 illustrated in FIGS. 1 and 2 and described above.

As illustrated in FIG. 4, the method 500 may include a step 510 of activating a makeup air system of the air conditioner unit. For example, activating the makeup air system may include opening a damper in a makeup air duct of the air conditioner unit and/or activating a makeup air fan to draw outside air directly to an indoor portion of the air conditioner unit, such as damper 408 and/or fan 406 of FIG. 3, as described above. Activating the makeup air system of the air conditioner unit may result in the flow of outside air being directed from the makeup air system to the indoor portion of the housing. For example, as may be seen, e.g., in FIGS. 1 and 2, the outside air may be provided from the second end 404 of the makeup air duct 400 to the indoor portion of the air conditioner unit, such as just upstream of the indoor inlet 138, e.g., between the indoor heat exchanger 122 and an air filter (while the air filter is not specifically illustrated, those of ordinary skill in the art will recognize that the air filter may be installed in the brackets 134 shown in FIG. 1).

When the makeup air system is activated, e.g., after, because of, and/or in response to the makeup air system being activated, the method may proceed to a step 520 of activating an indoor fan of the air conditioner unit at a fan speed at least equal to a minimum circulation threshold speed. As a result of activating the indoor fan, the flow of outside air from the makeup air system may be urged through the indoor portion of the housing. For example, the flow of outside air may thereby be circulated through the air conditioner unit and the conditioned space downstream of the air conditioner unit. Also by way of example, the flow of outside air may thereby be mixed with cooler drier air, e.g., air that is cooler and/or direr than the outside air, such as when the outside air is hot and/or humid relative to the indoor air.

In some embodiments, the method 500 may include and/or the controller of the air conditioner unit may be configured for comparing a target indoor fan speed to the minimum circulation threshold in response to the step of activating the makeup air system. For example, the target fan speed may be a setting, e.g., a parametric value, stored in a memory of the controller and the indoor fan may be activated at the target fan speed based on a selected mode of the air conditioner unit, e.g., heating or cooling mode, as well as on a difference between a target temperature or temperature setting and a measured ambient temperature. In such embodiments, activating the indoor fan of the air conditioner unit at the fan speed at least equal to the minimum circulation threshold speed may include operating the indoor fan at the target indoor fan speed when the target indoor fan speed is greater than or equal to the minimum circulation threshold speed and operating the indoor fan at the minimum circulation threshold when the target indoor fan speed is less than the minimum circulation threshold speed.

The target indoor fan spend may be greater than the minimum circulation threshold speed when the air conditioner unit is in heating mode or in cooling mode. Thus, in some embodiments, the step 520 of activating the indoor fan may include operating the indoor fan at the target indoor fan speed when the air conditioner unit is in the cooling mode and/or when the air conditioner unit is in the heating mode. For example, the target indoor fan speed when in the cooling mode and/or in the heating mode may be at least about five hundred rotations per minute (500 RPM), such as between about 500 RPM and about 1000 RPM.

The minimum circulation threshold speed may be a low speed, e.g., lower than typical operating speeds, such as lower than the exemplary speeds described above in the context of heating mode or cooling mode. For example, the minimum circulation threshold speed may be just fast enough to create a slight negative pressure between the air filter and the indoor heat exchanger, e.g., in order to avoid air and/or humidity (such as condensation from relatively humid outdoor air) accumulating at the outlet (second end 404) of the makeup air duct 400. In some embodiments, the minimum circulation threshold speed may be between about two hundred rotations per minute (200 RPM) and about three hundred rotations per minute (300 RPM), such as about 200 RPM, such as about 250 RPM, such as about 300 RPM.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an air conditioner unit, the air conditioner unit comprising a housing defining an outdoor portion and an indoor portion, the housing comprising a rear opening in the outdoor portion and a front opening in the indoor portion opposite the rear opening, a plenum attached to the housing at the outdoor portion of the housing, a makeup air system outside of the housing, and an indoor fan disposed in the indoor portion and downstream of the makeup air system with respect to a flow of outside air through the makeup air system, the method comprising:

activating the makeup air system of the air conditioner unit, activating the makeup air system of the air conditioner unit comprising activating a makeup air fan to draw the flow of outside air into the makeup air system from a makeup air passage of the plenum, whereby the flow of outside air is directed from the makeup air system directly to the indoor portion of the housing at the front opening of the housing without the outside air passing through the outdoor portion of the air conditioner unit; and activating the indoor fan of the air conditioner unit at a fan speed at least equal to a minimum circulation threshold speed in response to the makeup air system being activated, whereby the flow of outside air from the makeup air system is urged through the indoor portion of the housing.

2. The method of claim 1, further comprising comparing a target indoor fan speed to the minimum circulation threshold in response to the step of activating the makeup air system, wherein the step of activating the indoor fan comprises operating the indoor fan at the target indoor fan speed when the target indoor fan speed is greater than or equal to the minimum circulation threshold and operating the indoor fan at the minimum circulation threshold speed when the target indoor fan speed is less than the minimum circulation threshold speed.

3. The method of claim 1, wherein activating the makeup air system of the air conditioner unit comprises opening a damper in a makeup air duct of the air conditioner unit.

4. The method of claim 1, wherein the minimum circulation threshold speed is between about two hundred rotations per minute and about three hundred rotations per minute.

5. The method of claim 1, wherein the step of activating the indoor fan comprises operating the indoor fan at a target indoor fan speed when the air conditioner unit is in a cooling mode.

6. The method of claim 5, wherein the target indoor fan speed is at least five hundred rotations per minute when the air conditioner unit is in the cooling mode.

7. The method of claim 1, wherein the step of activating the indoor fan comprises operating the indoor fan at a target indoor fan speed when the air conditioner unit is in a heating mode.

8. The method of claim 7, wherein the target indoor fan speed is at least five hundred rotations per minute when the air conditioner unit is in the heating mode.

9. An air conditioner unit, comprising:

a housing defining an outdoor portion and an indoor portion, the housing comprising a rear opening in the outdoor portion and a front opening in the indoor portion opposite the rear opening;

a makeup air system outside of the housing, the makeup air system comprising a makeup air duct and a damper in the makeup air duct, the damper configured to move between an open position wherein outside air is permitted to flow through the makeup air duct and a closed position wherein air flow through the makeup air duct is obstructed, the makeup air duct extending from a first end positioned above and generally parallel to the rear opening to a second end positioned above and generally perpendicular to the front opening whereby the makeup air duct defines a single air flow path through the makeup air duct from the first end to the second end;

an indoor fan disposed in the indoor portion and downstream of the makeup air system with respect to a flow of outside air through the makeup air system; and a controller, the controller configured for:

activating the makeup air system of the air conditioner unit, whereby the flow of outside air is directed from the makeup air system to the indoor portion of the housing, wherein activating the makeup air system of the air conditioner unit comprises moving the damper in the makeup air duct of the air conditioner unit to the open position; and activating the indoor fan of the air conditioner unit at a fan speed at least equal to a minimum circulation threshold speed in response to the makeup air system being activated, whereby the flow of outside air from the makeup air system is urged through the indoor portion of the housing.

10. The air conditioner unit of claim 9, wherein the controller is further configured for comparing a target indoor fan speed to the minimum circulation threshold in response to the step of activating the makeup air system, wherein the step of activating the indoor fan comprises operating the indoor fan at the target indoor fan speed when the target indoor fan speed is greater than or equal to the minimum circulation threshold speed and operating the indoor fan at the minimum circulation threshold when the target indoor fan speed is less than the minimum circulation threshold speed.

11. The air conditioner unit of claim 9, wherein activating the makeup air system of the air conditioner unit comprises activating a makeup air fan to draw outside air directly to the indoor portion of the air conditioner unit.

12. The air conditioner unit of claim 9, wherein the minimum circulation threshold speed is between about two hundred rotations per minute and about three hundred rotations per minute.

13. The air conditioner unit of claim 9, wherein the step of activating the indoor fan comprises operating the indoor fan at a target indoor fan speed when the air conditioner unit is in a cooling mode.

14. The air conditioner unit of claim 13, wherein the target indoor fan speed is at least five hundred rotations per minute when the air conditioner unit is in the cooling mode.

15. The air conditioner unit of claim 9, wherein the step of activating the indoor fan comprises operating the indoor fan at a target indoor fan speed when the air conditioner unit is in a heating mode.

16. The air conditioner unit of claim 15, wherein the target indoor fan speed is at least five hundred rotations per minute when the air conditioner unit is in the heating mode.

* * * * *